April 19, 1927.

H. A. HOUSE

LINK BELTING

Filed Feb. 8, 1924

INVENTOR
Henry A. House,
BY
C. P. Goepel
ATTORNEY

Patented Apr. 19, 1927.

1,625,609

UNITED STATES PATENT OFFICE.

HENRY A. HOUSE, OF BRIDGEPORT, CONNECTICUT.

LINK BELTING.

Application filed February 8, 1924. Serial No. 691,331.

This invention relates to link belting, such for instance as that shown an described in my prior application for patent, Serial No. 595,036, filed October 17, 1922. As shown in said application, the belting is composed of a plurality of composite units, each consisting of a sheet metal plate and a friction member fixed to one side thereof, said plates at their opposite ends being provided with means for flexible interlocking connection with each other.

It is the primary object and purpose of my present improvements to so construct the complementary flexibly interlocked ends of the link plates and connect the same with each other that the belt as a whole will offer materially greater resistance to tensile strains, while at the same time a free relative flexing movement between the connected link plates is permitted.

In one embodiment of my invention, I provide each link plate at its ends with a plurality of longitudinally positioned loops spaced from each other transversely of the link plate, the loops on the end of one plate interfitting with the loops on the opposed end of the adjacent plate. Within these interfitting loops there is arranged a pair of hardened metal rods extending across the entire width of the belt and in parallel relation with each other, one of said rods being provided with a continuous longitudinally extending knife edge having a pivotal rocking engagement upon a seat formed in the opposed face of the other rod. The alternate loops of the link plates within which these rods are engaged exert a transverse strain or pressure upon the rods longitudinally of the belt in reverse longitudinal direction so that such tensile strains or pulls primarily devolve entirely upon the knife edge bearing, such strains being, therefore, equalized throughout the length of said rods transversely of the belt. Thus the strain upon the individual metal loops tending to bend or distort the same will be reduced to a minimum.

It is another important object of the invention to provide an improved form of the friction members and means for securing the same in a positive manner to one side of the link plates, the opposed edges of the adjacent friction members being serrated and extending over the flexible joint connection between the plates, said serrated edges adapted to limit the flexing movement of the link plates in one direction by abutting contact with each other.

It is a further general object of my invention to provide an improved interlocking connection between the link plates having the advantageous features above noted which is of simple construction and may be expeditiously manufactured at nominal cost, and is capable of application in belt structures adapted for a wide variety of industrial uses.

With the above and other objects in view the invention consists in the improved link belting and in the form, construction and arrangement of the several parts as will be hereinafter more fully described, illustrated in the accompanying drawing and subsequently incorporated in the subjoined claims.

In the drawing wherein I have disclosed one simple and practical embodiment of the invention and in which similar reference characters designate corresponding parts throughout the several views.

In the accompanying drawing, I have shown each link or section of the belting as consisting of two primary parts, namely, the sheet metal link plate 5 and the friction member 6 which may consist of felt, leather, canvas or other suitable frictional material for engagement with the pulley face, said friction member being secured to the inner face of the sheet metal link plate in a manner to be hereinafter described.

Preferably, the intermediate portion of the sheet metal plate 5 is bent to provide an arch therein which is spaced from the surface of the friction member 6.

Figure 1:
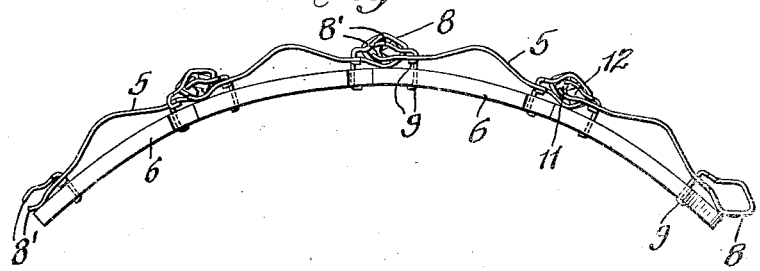
Figure 1 is a fragmentary edge view of a link belt embodying my present improvements.

The opposite end edges of each link plate which extend transversely of the belt, are provided with spaced longitudinally extending slots 7 therein, said edge portions of the link plate being suitably bent and extending inwardly towards the body of the plate. In this manner, by the provision of the slot 7, there is formed at each end edge of the plate a series of equi-distantly spaced substantially rectangular loops 8. Inwardly of these loops, the end edge of the metal sheet is provided with spurs 9 in line with the space or slots 7 between the loops 8. These spurs are adapted to be engaged through openings 10 formed in the link plate, the majority of said spurs extending through the friction members 6 and being securely clinched thereon so as to permanently secure said friction members in connection with the metal plates. The remaining spurs 9 are clinched upon the inner face of the link plate. On one end of each link plate, the loops 8 at the side edges of the plate have their opposed portions separated at the outer ends of the loops and compressed towards each other as shown at 8' in Figure 1 of the drawing so that these loop arms may be readily flexed. The purpose of this construction will presently appear.

Figure 2:
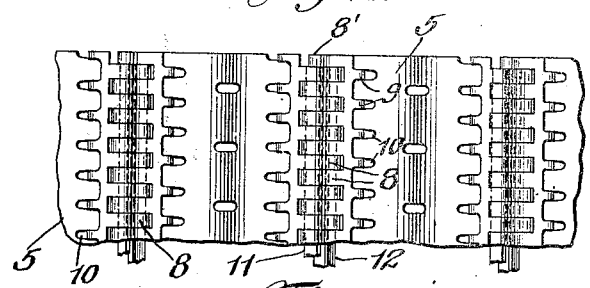
Figure 2 is a top plan view.
Figure 5:
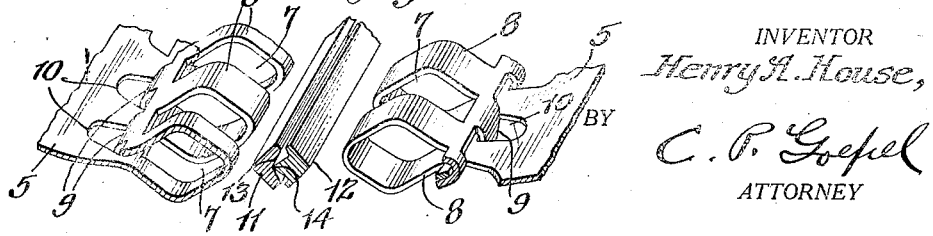
Figure 5 is a perspective view showing the parts of the flexible interlocking connection between the link plates separated from each other.

As clearly seen in Figure 2 of the drawing, when the belt links are assembled the series of spaced loops 8 on the end of one link plate are fitted into the space between the spaced loops 8 of an adjacent link plate. Two hardened metal rods 11 and 12 respectively, are then assembled and inserted together through the interfitting loops 8. As seen in Figure 5 of the drawing, each of these rods is of general triangular shape, one rod having a shallow V-shaped groove 13 in one of its faces, while the other rod upon its corresponding face is provided with a longitudinally extending knife edge 14. The base of the groove 13 provides a seat for this knife edge 14 so that the two rods 11 and 12 may have free rocking or oscillating motion relative to each other in the relative movement of the series of loops 8 on one link plate with respect to the connected series of loops on the adjacent link. After the assembled rods 11 and 12 have been inserted through the interfitting loops 8, the parts 8' at the side edges of one of the link plates are forced together by means of a pliers or other suitable tool to substantially the position shown in Figure 1 of the drawing so that they lie between the spaced parts of the loops 8 and thus act as stops, preventing the longitudinal movement of the rods 11 and 12 and their projection beyond the side edges of the belt.

Figure 3:
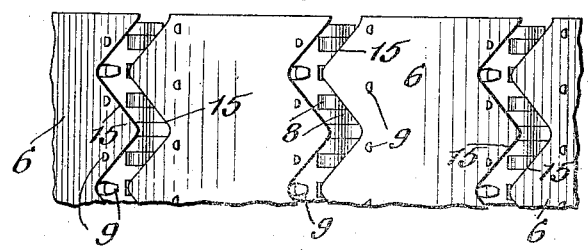
Figure 3 is a bottom plan view.
Figure 4:
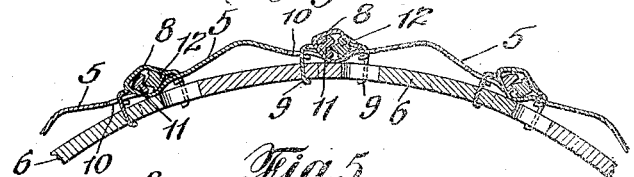
Figure 4 is a longitudinal section through the connected belt links.

It will be observed from reference to Figure 3 of the drawing that the edges of the friction member 6 extending transversely of the belt are serrated as at 15. These serrated edges extend over the flexibly interlocked ends of the link plates and afford a complete protection therefor against wear by contact with the pulley surface. These serrated edges 15 are also adapted to interfit with each other and by their abutting engagement limit the relative flexing movement of the belt links in one direction and determine the minimum diameter of the pulley face with which the belt may be properly engaged.

From the foregoing description, it will be apparent that when the sheet metal link plates are connected and flexibly interlocked with each other, the longitudinal pull or strain is uniformly distributed throughout the length of the hardened rods 11 and 12 engaged through the interfitting loops 8. This strain is concentrated upon the knife edge bearing 14 and the alternate arrangement of the loops 8 on the ends of the adjacent link plates also equally distributes the strain between these loops transversely across the belt link. Thus it has been found in actual test of this new link belting that it is capable of sustaining very severe tensile pull or strain without distortion or weakening at the flexible joint or connection between the link plates. Accordingly, such link belting may be advantageously applied and used as a driving member in various cases where exceptional tensile strength is an essential consideration and to which use the ordinary continuous leather belting could not be applied. At the same time, it will be appreciated that such a belt construction can be expeditiously produced and sold at comparatively small cost, in view of the advantages which may be realized from the use thereof. Thus the sheet metal link plates 5 can be readily stamped out in a single die stamping operation, and then properly bent to form the loops 8 therein. The reinforcing pivoting or rocking rods 11 and 12 for these loops are likewise of simple construction and after the link plates have been fixed upon the friction members 6 by means of the spurs 9, said rods can be readily assembled and inserted through the interfitting loops. The serrated edges 15 of the friction members 6 may be so spaced apart that any desired degree of relative flexing movement of the connected links can be obtained.

In the foregoing description, I have referred to a preferred form of the loops 8 and the means for clinching the metal link plates upon the friction member 6. However, these as well as the other described features of the device are susceptible of more or less variation, and the essential characteristics of the present improvements may possibly be exemplified in other alternative structures. Accordingly, it is to be understood that I reserve the privilege of adopting all such legitimate changes in the form, proportion and relative arrangement of the several parts as may be fairly embodied within the spirit and scope of the invention as claimed.

I claim:

1. A link belting comprising friction sections, sheet metal plates, each plate at its opposite ends being bent outwardly upon itself and longitudinally slotted to provide a plurality of loops therein, spaced from each other transversally of the plates, the ends of the plates having extended prongs adapted to pass through the plate and connect the loops with the friction sections of the belting, the loops on one link adapted for interfitting engagement in the spaces between the loops in the adjacent link plate and rods extending through the loops.

2. A link belting comprising friction sections, sheet metal plates, each plate at its opposite ends being bent outwardly upon itself and longitudinally slotted to provide a plurality of angular loops therein spaced from each other transversally of the plates, the ends of the plates having extended prongs adapted to pass through the plate and connect the loops with the friction sections of the belting, the loops of one link plate adapted for interfitting engagement in the space between the loops on the adjacent link plate, and rods extending through the loops and having angular faces corresponding therewith, and the inner faces of the rod constructed to have a rolling contact.

3. A link belting comprising friction sections, sheet metal plates, each plate at its opposite ends being bent upon itself, and longitudinally slotted to provide a plurality of angular loops therein spaced from each other transversally of the plates, the ends of the plate being arranged upon the plate and having prongs extending through openings in the plate and adapted to connect the loops with the friction sections of the belting, the loops on one link plate adapted for interfitting engagement in the spaces between the loops on the adjacent link plate, and a connecting member extending through the loops.

4. A link belting comprising friction sections, sheet metal plates, each plate at its opposite ends being bent upon itself and longitudinally slotted to provide a plurality of angular loops therein spaced from each other transversally of the plate, the ends of the plate having extended prongs adapted to connect the loops with the friction sections of the belting, the loops on one link plate adapted for interfitting engagement in the spaces between the loops on the adjacent link plate, rods extending through the loops and having angular faces corresponding with the loops and holding them against movement therein, one of said loops having a longitudinally extending knife edge and the other rod having a bearing seat for said knife edge, whereby said rods are held against movement in the loops and have a free pivotal or rocking movement on each other on the flexing of the belt links relative to each other.

5. A link belting comprising friction sections, sheet metal plates, each plate at its opposite ends being bent upon itself and longitudinally slotted to provide a plurality of angular loops therein spaced from each other transversely of the plate, the ends of the plate being arranged above the plate, and having prongs extending through openings in the plate and adapted to connect the loops with the friction sections of the belting, the loops on one link plate adapted for interfitting engagement in the spaces between the loops on the adjacent link plate, two rods extending through the loops and having angular faces corresponding with the loops and holding them against movement therein, one of said loops having a longitudinally extending edge engaging a bearing seat carried by the other rod, whereby said rods are held against movement in the loops and have a free pivotal or rocking movement on each other on the flexing of the belt links relative to each other.

In testimony that I claim the foregoing as my invention, I have signed my name hereto.

HENRY A. HOUSE.